US011480183B2

(12) United States Patent
Choi et al.

(10) Patent No.: US 11,480,183 B2
(45) Date of Patent: Oct. 25, 2022

(54) HERMETIC BLOWER FOR HIGH-TEMPERATURE GAS

(71) Applicant: InGineers, Gimhae-si (KR)

(72) Inventors: Mun Kyoung Choi, Pohang-si (KR); Chang Kyu Song, Gimhae-si (KR); Sun Jin Kim, Busan (KR); Kwang Hyun Jeong, Busan (KR)

(73) Assignee: InGineers, Gimhae-si (KR)

( * ) Notice: Subject to any disclaimer, the term of this patent is extended or adjusted under 35 U.S.C. 154(b) by 10 days.

(21) Appl. No.: 17/037,059

(22) Filed: Sep. 29, 2020

(65) Prior Publication Data

US 2021/0164479 A1 Jun. 3, 2021

(30) Foreign Application Priority Data

Nov. 28, 2019 (KR) ........................ 10-2019-0155165

(51) Int. Cl.
| F04D 25/06 | (2006.01) |
| F04D 25/02 | (2006.01) |
| F04D 29/056 | (2006.01) |
| F04D 29/10 | (2006.01) |
| F04D 29/44 | (2006.01) |
| F04D 29/58 | (2006.01) |
| F04D 29/28 | (2006.01) |

(Continued)

(52) U.S. Cl.
CPC .......... *F04D 25/06* (2013.01); *F04D 25/026* (2013.01); *F04D 29/056* (2013.01); *F04D 29/102* (2013.01); *F04D 29/281* (2013.01); *F04D 29/441* (2013.01); *F04D 29/5853* (2013.01); *F04D 17/10* (2013.01); *F04D 29/053* (2013.01)

(58) Field of Classification Search
CPC .... F04D 13/024; F04D 13/025; F04D 13/026; F04D 13/027; F04D 25/026; F04D 25/06; F04D 29/053; F04D 29/056; F04D 29/102; F04D 29/281; F04D 29/441; F04D 29/5806; F04D 29/5853; F04D 17/10
See application file for complete search history.

(56) References Cited

U.S. PATENT DOCUMENTS 5,334,004 A * 8/1994 Lefevre ................... F01D 11/04
415/113
7,670,118 B2 * 3/2010 Sato .................. H01M 8/04014
417/420

(Continued)

FOREIGN PATENT DOCUMENTS

DE 102007058155 A1 * 6/2009 ........... F04D 25/026
GB 2394003 A * 4/2004 ............. F04D 5/001

(Continued)

OTHER PUBLICATIONS

English Machine Translation of Description for JP03112181A (Year: 1991).*

(Continued)

*Primary Examiner* — Nathan C Zollinger
(74) *Attorney, Agent, or Firm* — Paratus Law Group, PLLC

(57) ABSTRACT

Discloses is a hermetic blower for high-temperature gas, including: a blower unit in which the inside is hermetic so as to prevent an internal working fluid from being leaked to the outside; a motor unit supplying power to the blower unit; and a magnetic coupling unit connecting the blower unit and the motor unit by using a magnetic force.

5 Claims, 5 Drawing Sheets

(51) Int. Cl.
*F04D 29/053* (2006.01)
*F04D 17/10* (2006.01)

(56) References Cited

U.S. PATENT DOCUMENTS

| | | | |
|---|---|---|---|
| 10,428,822 B1* | 10/2019 | Wang | F04D 13/024 |
| 2005/0163610 A1* | 7/2005 | Higashimori | F04D 29/444 |
| | | | 415/191 |
| 2006/0144387 A1* | 7/2006 | Sato | F04D 29/5853 |
| | | | 126/110 R |
| 2014/0023535 A1* | 1/2014 | Hoshi | F04D 29/047 |
| | | | 417/420 |
| 2020/0011341 A1* | 1/2020 | Martignago | F01D 25/125 |

FOREIGN PATENT DOCUMENTS

| | | | | |
|---|---|---|---|---|
| JP | 03112181 A | * | 5/1991 | ............ H01S 3/036 |
| JP | H07-111752 A | | 4/1995 | |
| JP | 2008-517215 A | | 5/2008 | |
| JP | 2013-057250 A | | 3/2013 | |
| JP | 2013057250 A | * | 3/2013 | |
| JP | 2015-183568 A | | 10/2015 | |
| KR | 10-0781298 B1 | | 11/2007 | |
| KR | 10-2016-0122495 A | | 10/2016 | |
| KR | 10-2019-0107127 A | | 9/2019 | |
| WO | WO-2012120722 A1 | * | 9/2012 | ........... F04D 25/026 |

OTHER PUBLICATIONS

Korean Final Office Action for related KR Application No. 10-2019-0155165 dated Apr. 2, 2021 from Korean Intellectual Property Office.

Korean Office Action for related KR Application No. 10-2019-0155165 dated Nov. 18, 2020 from Korean Intellectual Property Office.

* cited by examiner

HERMETIC BLOWER FOR HIGH-TEMPERATURE GAS

CROSS-REFERENCE TO RELATED APPLICATION

This application claims priority to Korean Patent Application No. 10-2019-0155165 (filed on Nov. 28, 2019), which is incorporated herein by reference in its entirety.

BACKGROUND

The present invention relates to a hermetic blower for high temperature gas, and more particularly, a hermetic blower for high-temperature gas, adopts a sealing cap and magnetic coupling for sealing of a foil bearing and a working fluid so as to be used for a long time in high-temperature environment such as a solid oxide fuel cell (SOFC) system that should pressurize and transport a high-temperature fluid.

A solid oxide fuel cell (SOFC) is less sensitive to a pressure change of reactant gas to output various ranges of outputs and for this reason, the SOFC can be applied to various fields such as a power source of a pollution-free vehicle, a self-generated power source, a mobile power source, and a military power source. In general, the solid oxide fuel cell (SOFC) is a device that generates electricity while generating water by electrochemically reacting hydrogen and oxygen, and a supplied hydrogen is separated into hydrogen ions and electrons in a catalyst of a cathode electrode, and the separated hydrogen ions are passed to an anode through an electrolyte membrane.

In addition, in order to obtain a potential required for actual use, unit cells should be stacked as much as the required potential, and the stacked unit cells are called a fuel cell stack, and in the fuel cell stack, hydrogen flows to the anode and air or oxygen flows to the cathode, an electrochemical reaction occurs therein, thereby generating high-efficiency electrical energy and water by reaction. Meanwhile, in a blower used in an SOFC system, the blower pressurizes and transports high-temperature gas of which temperature increases after the electrochemical reaction. In this case, as the blower is used for a long time, high-temperature heat is generated and the blower cannot endure the high-temperature heat, and thus durability of parts is rapidly reduced.

Accordingly, there is a need for a blower which can cool the high-temperature heat generated during long-term use and can be smoothly used even in a high-temperature environment.

Meanwhile, Korean Patent Registration No. 10-0781298 discloses a technology related to a blower.

SUMMARY

The present invention has been made in an effort to provide a hermetic blower for high-temperature gas, which may cool high-temperature heat generated as being used for a long time and may be smoothly used even in a high-temperature environment for a long time, and does not leak a high-temperature working fluid to the outside.

Objects to be solved by the present invention are not limited to the aforementioned objects and other unmentioned objects to be solved by the present invention will be clearly understood by those skilled in the art from the following description.

An exemplary embodiment of the present invention provides a hermetic blower for high-temperature gas including: a blower unit in which the inside is hermetic so as to prevent an internal working fluid from being leaked to the outside; a motor unit supplying power to the blower unit; and a magnetic coupling unit connecting the blower unit and the motor unit by using a magnetic force, in which the blower unit includes a housing, a blower shaft which rotates by receiving the power from the motor unit, an impeller which rotates with being coupled to one end of the blower shaft to generate a flow of a fluid, a heat shield shielding heat generated while the blower shaft operates, a sealing cap coupled to the other end of the blower shaft to seal the housing, a bearing member supporting an axial force of the blower shaft, a volute guiding the flow of the working fluid from a centrifugal direction to a linear direction based on a rotational center axis of the blower shaft, and a diffuser coupled to one side of the volute and restoring a pressure of the working fluid reduced by the volute, and the blower unit receives the power from the motor unit by the magnetic coupling unit while being connected to the motor unit and is sealed by the sealing cap so as to prevent the working fluid from being leaked to the outside of the housing.

Further, the motor unit may include a motor shaft rotatably installed at a center portion of the body, a motor rotor installed at the center portion of the motor shaft, a motor stator covering the motor rotor and installed inside the body, and a bearing member supporting the axial force of the motor shaft, and the blower shaft and the motor shaft may be indirectly connected by the magnetic coupling unit to prevent heat generated from the blower unit from being directly transferred to the motor unit.

Further, when power of a predetermined torque or higher which may be transferred by the magnetic coupling unit is momentarily generated in the motor unit, even though the motor shaft rotates, the magnetic coupling unit does not transfer the power of the predetermined torque or higher to the blower shaft and the blower shaft does not rotate so as to prevent the blower shaft from being damaged and enhance durability.

Further, a coating layer may be formed on an outer circumferential surface of the bearing member to enhance the durability.

Further, the hermetic blower for high-temperature gas may further include a motor cooling fin having one surface formed uneven and installed on an outer surface of the motor.

According to an exemplary embodiment of the present invention, there is an effect that a hermetic blower for high-temperature gas has excellent thermal resistance so as to be smoothly used even in an environment in which the hermetic blower is exposed to high-temperature heat in the process of pressurizing and transporting a working fluid used in a solid oxide fuel cell (SOFC) system, and as a result, durability is enhanced.

Effects which can be obtained in the present invention are not limited to the aforementioned effects and effects of the present invention mentioned herein will be clearly understood by those skilled in the art from the following description.

DETAILED DESCRIPTION

Hereinafter, An exemplary embodiment to be described below is intended to be described in detail to enable those skilled in the art to easily carry out the invention and it is not meant that the technical spirit and scope of the present invention are limited thereto and it should be appreciated that the exemplary embodiment includes all changes, equivalents, or substitutions including the technical spirit and scope of the present invention.

Figure 1:
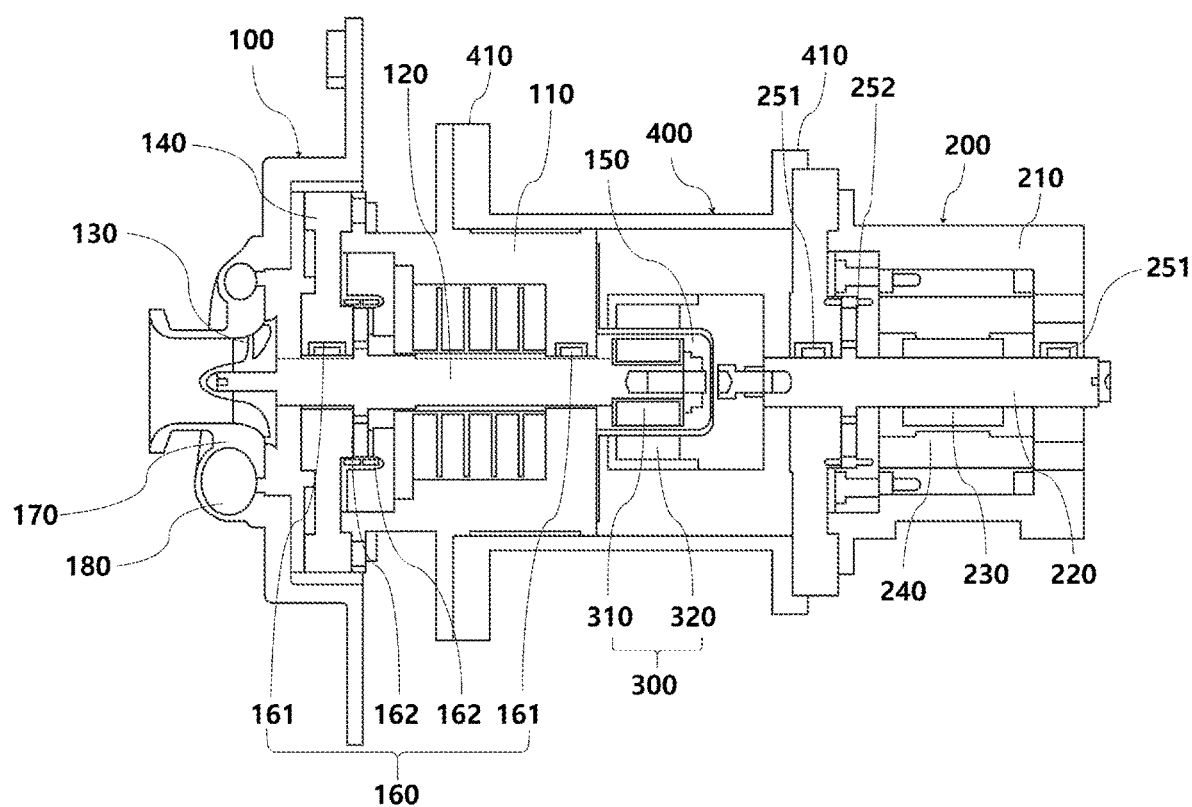
FIG. 1 is a cross-sectional view illustrating a state in which a hermetic blower for high-temperature gas is combined according to the present invention.
Figure 2:
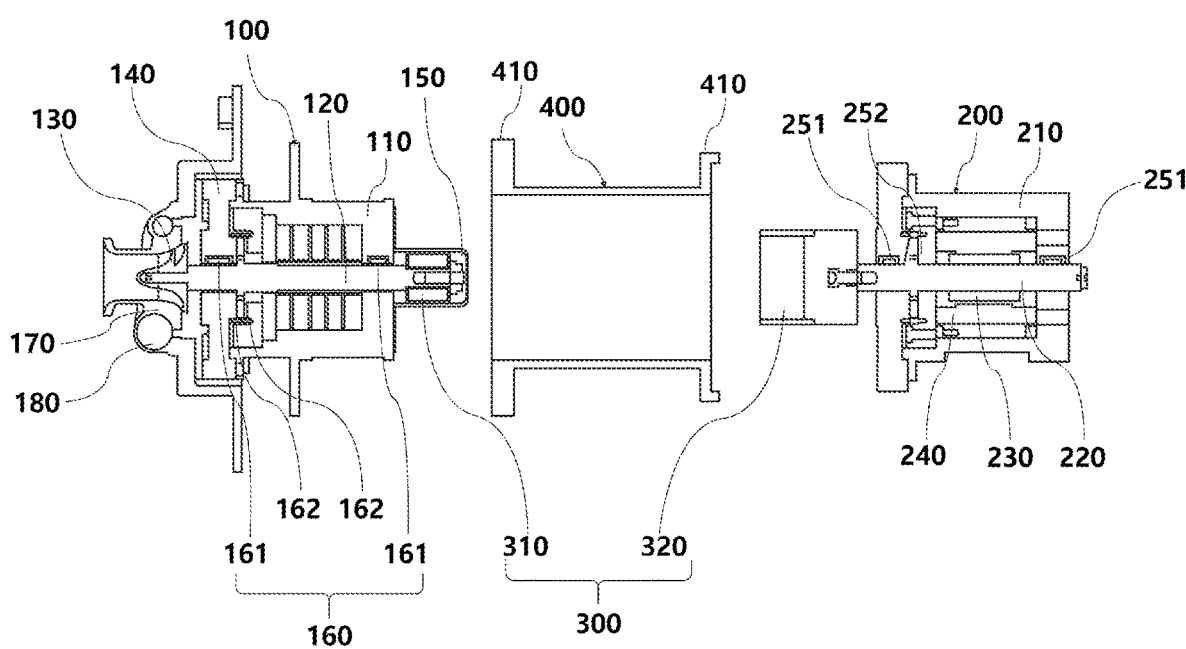
FIG. 2 is a cross-sectional view illustrating a state in which a hermetic blower for high-temperature gas is separated according to the present invention.

Of the accompanying drawings, FIG. 1 is a cross-sectional view illustrating a state in which a hermetic blower for high-temperature gas is combined according to the present invention and FIG. 2 is a cross-sectional view illustrating a state in which a hermetic blower for high-temperature gas is separated according to the present invention.

Hereinafter, the exemplary embodiment will be described below in detail with reference to the aforementioned contents and the accompanying drawings.

Referring to FIGS. 1 and 2, the hermetic blower for high-temperature gas includes a blower unit in which the inside is sealed so as to prevent an internal working fluid from leaking to the outside, a motor unit 200 supplying power to the blower unit 100, a magnetic coupling unit 300 connecting the blower unit 100 and the motor unit 200 by using magnetic force, and a cover unit 400 which is formed in a hollow cylindrical shape so that the magnetic coupling unit 300 is positioned therein.

In more detail, the blower unit 100 includes a housing 110, a blower shaft 120 which rotates by receiving the power from the motor unit 200, an impeller 130 which rotates with being coupled to one end of the blower shaft 120 to generate a flow of a fluid, a heat shield 140 shielding heat generated while the blower shaft 120 operates, a sealing cap 150 which is coupled to the other end of the blower shaft 120 to seal the housing 110, a bearing member 160 supporting an axial force of the blower shaft 120, a volute 170 guiding flowing of the working fluid from a centrifugal direction to a linear direction based on a rotational center axis of the blower shaft 120, and a diffuser 180 coupled to one side of the volute 170 to restore a pressure of the working fluid reduced by the volute 170.

More specifically, the housing 110 is formed in a hollow shape and one side and the other side are formed to be open. Further, a width of one side of the housing 110 at which a front end portion of the blower shaft 120 is positioned is formed to be larger than that of the other side of the housing 120 at which a rear end portion of the blower shaft 120 is positioned.

Further, in the blower shaft 120, the other end portion is coupled from one side to the other side of the housing 110 by penetrating the inside of the housing 110.

Further, the impeller 130 is coupled to one end portion of the blower shaft 120. In addition, so that the impeller 130 rotates together as the blower shaft 120 rotates to generate the flow of the fluid, blades are formed radially based on a center portion.

Further, the heat shield 140 is spaced apart based on the center portion of the blower shaft 120 to be coupled to cover the blower shaft 120. In other words, the heat shield 140 is coupled to the blower shaft 120 adjacent to a rear end of the impeller 130.

Further, the sealing cap 150 has a groove having a substantially "⊏" shape at the center portion and is coupled to the other side of the housing 110 while covering the other end portion of the blower shaft 120 which protrudes to the other side of the housing 110 so as to seal the inside of the housing 110.

Further, the bearing member 160 includes a journal foil bearing 161 coupled to both sides of the blower shaft 120 based on a longitudinal direction of the blower shaft 120 and having heat resistance so as to support the blower shaft 120 even when heat is generated as the blower unit 100 operates and a thrust foil bearing 162 supporting the axial force generated from the blower shaft 120 as the blower unit 100 operates. In addition, the journal foil bearings 161 are spaced apart forward and backward based on the center portion of the blower shaft 120 and coupled one by one. In addition, the thrust foil bearing 162 is coupled to the center portion of the blower shaft 120 and more specifically, the thrust foil bearing 162 is coupled while being spaced apart from the rear end of the journal foil bearing 161 coupled to the front of the blower shaft 120.

Meanwhile, a coating layer may be formed on an outer circumferential surface of the bearing member 160. The coating layer may include Teflon. Accordingly, the heat resistance of the bearing member 160 is further enhanced, and as a result, the durability of the hermetic blower for high-temperature gas of the present invention may be enhanced.

Further, the volute 170 is coupled to one side of the housing 110 so as to seal the inside of the housing 110. Further, a toroidal passage is formed inside the volute 170 based on the rotational center axis of the blower shaft 120 so as to guide the flow of the working fluid from the centrifugal direction to the linear direction.

Further, the diffuser 180 is coupled to one side of the volute 170 and a cross-sectional area gradually increases toward the end portion of the volute 170 so as to increase a state pressure by reducing a flow rate of the working fluid reduced by the volute 170. That is, the diffuser 180 restores the pressure of the working fluid reduced by the volute 170.

Further, the motor unit 200 includes a body 210, a motor shaft 220 rotatably installed at the center portion of the body 210, a motor rotor 230 installed at the center portion of the motor shaft 220, a motor stator 240 covering the motor rotor 230 and installed inside the body 210, and a bearing member 250 supporting the axial force of the motor shaft 220. As an example, as the motor unit 200, a step motor may be used.

Further, the body 210 is formed in a hollow cylindrical shape.

In addition, the motor shaft 220 is coupled through the body 210 in a front-rear direction of the body 210. In addition, the motor shaft 220 may be rotated by the motor rotor 230 and the motor stator 240. Further, the motor shaft 220 may rotate by receiving a power source from the outside.

In addition, the bearing member 250 is coupled even to the motor shaft 220. More specifically, the bearing member 250 coupled to the motor shaft 220 may include a journal bearing which is spaced apart forward and backward based on the center portion of the motor shaft 220 and installed one by one to support the motor shaft 220 and a thrust bearing 252 which is spaced apart from the rear end of the journal bearing 251 installed at the front of the motor shaft 220 and coupled to the motor shaft 220 to support the axial force generated while the motor shaft 220 rotates. Further, as the bearing member 250, a ball bearing or an air foil bearing may be used. In other words, the ball bearing or air foil bearing may be used instead of the journal bearing 251 and the thrust bearing 252 and is not limited thereto and anything may support the motor shaft 220 and support the axial force generated with the rotation of the motor shaft 220 may be used. Further, the coating layer may be formed on the outer circumferential surface of the bearing member 250.

Meanwhile, the motor unit 200 may further include a motor cooling fin having one surface which is uneven and installed on an outer surface of the motor stator 240. More specifically, in the motor cooling fin, the other surface contacting the motor stator 240 is formed by a smooth surface and multiple projections are formed to protrude from the motor cooling fin in a zigzag form. In other words, it may be seen that multiple grooves are formed on the outer surface of the motor stator 240 so that the external air moves in the longitudinal direction of the motor shaft 220. Accordingly, there will be an effect that the motor unit 200 of the present invention may be smoothly cooled and the durability of the motor unit 200 is enhanced.

Further, the magnetic coupling unit 300 includes a male magnetic coupling 310 installed inside the sealing cap 150 and coupled to the other end portion of the blower shaft 120 and a female magnetic coupling 320 having a receiving groove at the center portion so that the sealing cap is inserted and coupled to one end of the motor shaft 220.

Further, the guide unit 410 is formed to protrude on both end portions so that one end portion is coupled to the housing 110 and the other end portion is coupled to the body 210.

Hereinafter, an effect of the hermetic blower for high-temperature gas according to the present invention will be described in detail.

When the conventional blower used in the solid oxide fuel cell (SOFC) system is described, mixed gas in the system may be leaked through a shaft according to an operation condition.

More specifically, the conventional blower will have a gap in the process of combining with other parts. That is, the inside of the conventional blower may not be completely sealed and the gap is generated between the shaft or a case. In addition, the working fluid of which electrochemical reaction occurs inside the solid oxide fuel cell (SOFC) system flows into the conventional blower through the impeller. Accordingly, the inside of the conventional blower is fully filled with the working fluid. Further, in the slid oxide fuel cell (SOFC) system, external air is circulated to cool a motor supplying the power to the conventional blower.

Further, as the conventional blower operates, the working fluid which flows into the conventional blower is pressurized and heat is generated.

In addition, when the internal pressure of the conventional blower is higher than atmospheric pressure, the working fluid inside the conventional blower is leaked to the outside to be mixed with the external air cooling the motor. Accordingly, when the working fluid is leaked to the outside, there is a problem in that energy generation efficiency of the solid oxide fuel cell (SOFC) system deteriorates.

Further, when the internal pressure of the conventional blower is lower than the atmospheric pressure, the external air flows into the conventional blower to be mixed with the working fluid. Accordingly, there is a problem in that the external air mixed with the working fluid and the energy generation efficiency of the solid oxide fuel cell (SOFC) system thus deteriorates.

In other words, in the conventional blower, when a fluid compression ratio inside the blower is high, the mixed gas in the system may be leaked to the outside and when the fluid compression ratio inside the blower is low, the external air of the system flows into the system and efficiency of the blower thus deteriorates.

The hermetic blower for high-temperature gas according to the present invention has an effect that the blower unit 100 receives the power from the motor unit 200 by the magnetic coupling unit 300 while being connected to the motor unit 200 and the inside is sealed by the sealing cap 150 and the working fluid does not leak to the outside of the housing 110.

Further, the blower shaft 120 and the motor shaft 220 are indirectly connected by the magnetic coupling unit 300 to prevent the heat generated from the blower unit 100 to be directly transferred to the motor unit 200.

Further, power of predetermine torque or higher which may be transferred by the magnetic coupling unit 300 is momentarily generated in the motor unit 200, even though the motor shaft 220 rotates, the magnetic coupling unit 300 does not transfer the power of the predetermined torque higher to the blower shaft 120 and the blower shaft 120 does not rotate, thereby enhancing the durability by preventing the blower unit 100 from being damaged.

Further, there is an effect that the coating layer is formed on the outer circumferential surfaces of the bearing members 160 and 250 and the durability is enhanced.

Further, in the hermetic blower for high-temperature gas according to the present invention, the blower unit 100 and the motor unit 200 may be separated from each other and when the problem occurs in the motor unit 200, only the motor unit 200 is replaced, thereby reducing maintenance cost.

Further, in the hermetic blower for high-temperature gas according to the present invention, the working fluid inside the blower unit 100 and the external air for cooling the motor unit 200 and rotating the impeller 130 are divided into both sides based on the magnetic coupling unit 300, thereby reducing interference between the working fluid and the external air.

Hereinafter, a detailed embodiment of the hermetic blower for high-temperature gas according to the present invention will be described in detail.

Figure 3:
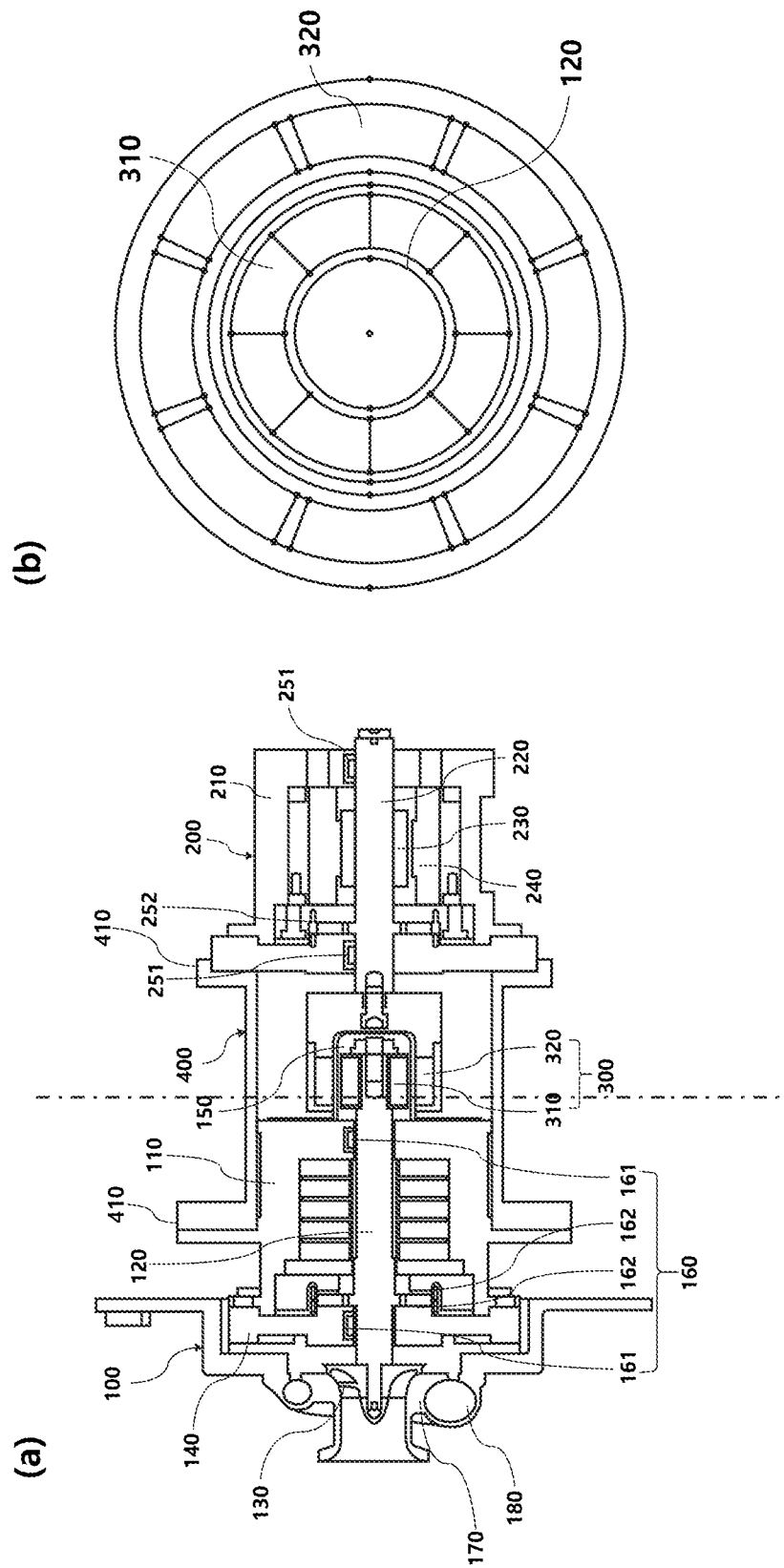
FIG. 3 is a cross-sectional view illustrating a combination state of a blower shaft and a magnetic coupling unit of a hermetic blower for high-temperature gas according to an exemplary embodiment of the present invention.

Referring to FIG. 3, in the hermetic blower for high-temperature gas the blower unit 100 and the motor unit 200 are coupled by the magnetic coupling unit 300 and there is a problem in that the blower unit 100 and the motor unit 200 are vulnerable to heat which flows in along the blower shaft 120 provided in the blower unit 100. Therefore, at least a part of the magnetic coupling unit 300 may be made of an alnico material. That is, the male magnetic coupling 310 is made of the alnico material to minimize deterioration in durability due to the heat which flows in along the blower shaft 120.

Figure 4:
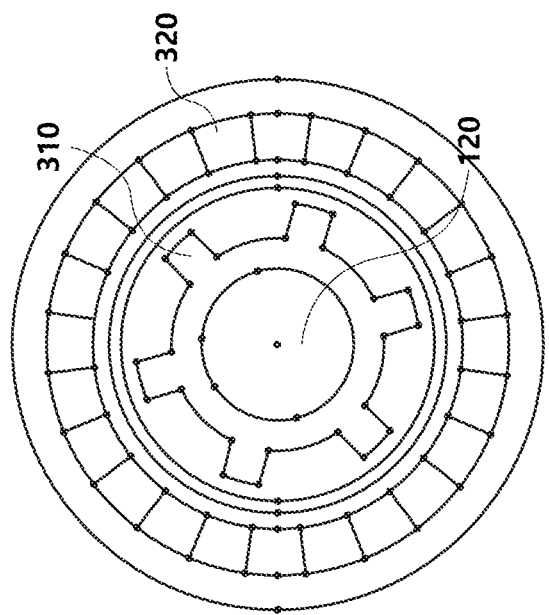
FIG. 4 is a cross-sectional view illustrating a combination state of a blower shaft and a magnetic coupling unit of a hermetic blower for high-temperature gas according to another exemplary embodiment of the present invention.
Figure 4:
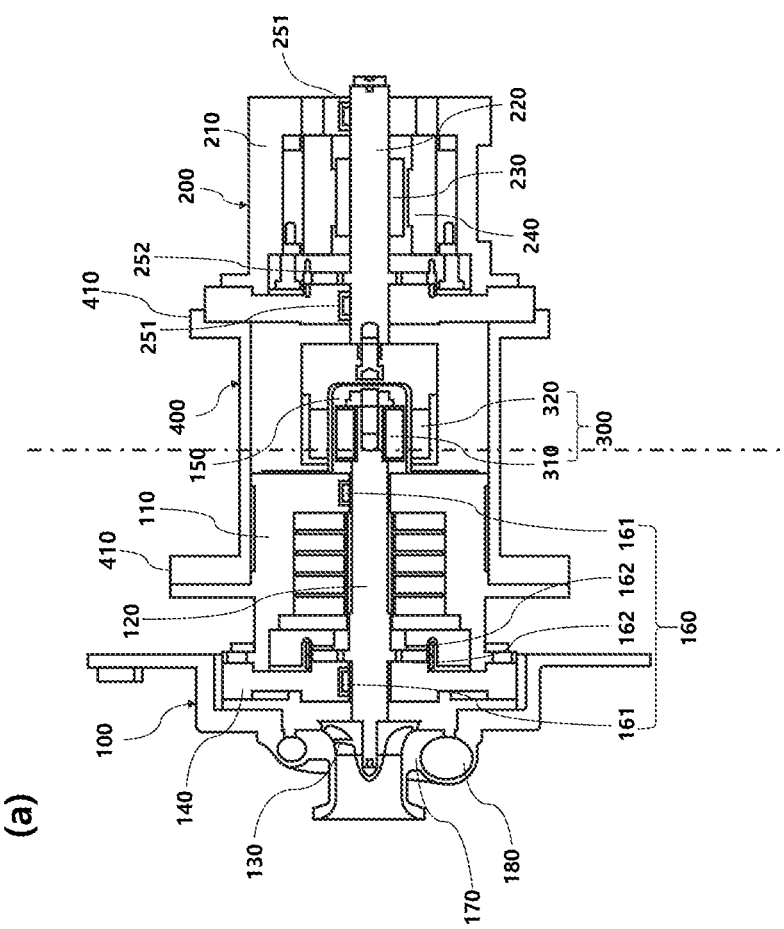
Figure 5:
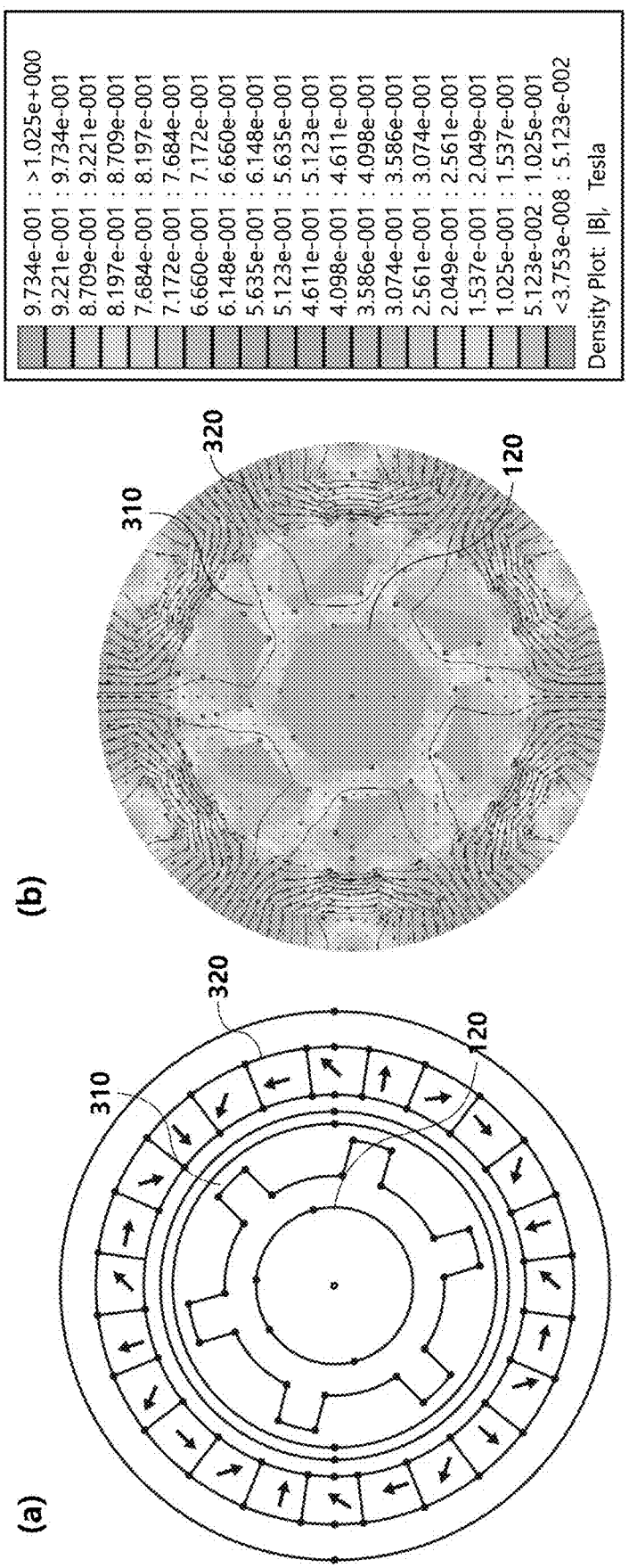
FIG. 5 is a diagram illustrating a magnetic line generated due to a magnetic coupling unit of a hermetic blower for high-temperature gas according to another exemplary embodiment of the present invention.

Further, referring to FIG. 4, the male magnetic coupling 310 may be provided in an uneven shape. Here, there is an advantage in that the male magnetic coupling 310 is provided in the uneven shape and the magnetic line formed between the male magnetic coupling 310 and the female magnetic coupling 320 may enhance torque of the blower unit 100. More specifically, when the male magnetic coupling 310 is provided in the uneven shape, the magnetic line is formed between the male magnetic coupling 310 and the female magnetic coupling 320 to rotate the blower unit 100 as illustrated in FIG. 5. That is, the magnetic force formed between the male magnetic coupling 310 and the female magnetic coupling 320 rotates the blower unit 100 counterclockwise to enhance the torque of the blower unit 100. As an example, the male magnetic coupling 310 and the female magnetic coupling 320 may be a form in which the magnetic line leaks from one irregularity in a Halbach array and the magnetic line thus flows in from an adjacent irregularity. Further, the male magnetic coupling 310 is provided by a material in which damage by the heat is minimized and the magnetic line is smoothly formed by the female magnetic coupling 320 provided adjacent to the male magnetic coupling 310 to reduce time and cost required for manufacturing.

Although the present invention has been described in association with the preferred embodiment, it can be easily recognized by those skilled in the art that various modifications and changes can be made without departing from the gist and the scope of the present invention and it is apparent that the changes and modifications are all included in the appended claims.

What is claimed is:

1. A hermetic blower for high-temperature gas, comprising:
    a blower unit in which the inside is hermetic so as to prevent an internal working fluid from being leaked to the outside;
    a motor unit supplying power to the blower unit;
    a magnetic coupling unit indirectly connecting the blower unit and the motor unit by using a magnetic force; and
    a cover unit which is formed in a hollow cylindrical shape so that the magnetic coupling unit is positioned in the cover unit,
    wherein the blower unit includes
        a housing,
        a blower shaft which rotates by receiving the power from the motor unit,
        an impeller which rotates with being coupled to one end of the blower shaft to generate a flow of a fluid,
        a heat shield shielding heat generated while the blower shaft operates,
        a sealing cap covering the other end of the blower shaft to seal the housing,
        a bearing member supporting an axial force of the blower shaft,
        a volute guiding the flow of the working fluid from a centrifugal direction to a linear direction based on a rotational center axis of the blower shaft, and
        a diffuser coupled to one side of the volute and restoring a pressure of the working fluid reduced by the volute,
    wherein the housing includes a protrusion vertically protruding from an outer circumferential surface of the housing at a central portion of the housing so as to be coupled with the cover unit,
    wherein the blower unit receives the power from the motor unit by the magnetic coupling unit while being indirectly connected to the motor unit,
    wherein the blower unit is sealed by the sealing cap so as to prevent the working fluid from being leaked to the outside of the housing,
    wherein the blower unit is indirectly connected to the motor unit by using the magnetic force between a male magnetic coupling installed inside the sealing cap and a female magnetic coupling coupled to the motor unit when the sealing cap is inserted into the female magnetic coupling,
    wherein the male magnetic coupling has an uneven shape along a circumference of the male magnetic coupling such that a plurality of projections protrude from a radially inner surface of the male magnetic coupling and each projection of the plurality of projections extends axially along the male magnetic coupling,
    wherein the cover unit includes a guide unit which is formed to protrude on both end portions of the cover unit,
    wherein the guide unit includes:
        a first guide vertically protruded from one end of the cover unit so as to be coupled with the protrusion of the housing; and
        a second guide vertically protruded from the other end of the cover unit and then bent at an end thereof toward the motor unit so as to be coupled with the motor unit,
    wherein the cover unit covers a portion of the housing so as to support the housing, and
    wherein the magnetic coupling unit is positioned inside the cover unit with a gap when the motor unit is coupled with the cover unit.

2. The hermetic blower for high-temperature gas of claim 1,
    wherein the motor unit includes
        a body,
        a motor shaft rotatably installed at a radial center portion of the body,
        a motor rotor installed at the radial center portion of the motor shaft,
        a motor stator covering the motor rotor and installed inside the body, and
        a bearing member supporting the axial force of the motor shaft, and
    wherein the blower shaft and the motor shaft are indirectly connected by the magnetic coupling unit to prevent heat generated from the blower unit from being directly transferred to the motor unit.

3. The hermetic blower for high-temperature gas of claim 2,
    wherein when power of a predetermined torque or higher which may be transferred by the magnetic coupling unit is momentarily generated in the motor unit, even though the motor shaft rotates, the magnetic coupling unit does not transfer the power of the predetermined torque or higher to the blower shaft and the blower shaft does not rotate so as to prevent the blower shaft from being damaged and enhance durability.

4. The hermetic blower for high-temperature gas of claim 1,
    wherein a coating layer is formed on an outer circumferential surface of the bearing member to enhance the durability.

5. The hermetic blower for high-temperature gas of claim 1, wherein the plurality of projections protruding from the male magnetic coupling include at least two projections protruding radially from each circumferential portion of a plurality of different circumferential portions of the male magnetic coupling.

\* \* \* \* \*